United States Patent
Kuylenstierna et al.

(10) Patent No.: US 12,012,862 B2
(45) Date of Patent: Jun. 18, 2024

(54) INTERNAL COMBUSTION ENGINE SYSTEM

(71) Applicant: VOLVO TRUCK CORPORATION, Gothenburg (SE)

(72) Inventors: Claes Kuylenstierna, Mölnlycke (SE); Pontus Eriksson, Helsingborg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/813,452

(22) Filed: Jul. 19, 2022

(65) Prior Publication Data
US 2023/0021590 A1 Jan. 26, 2023

(30) Foreign Application Priority Data
Jul. 26, 2021 (EP) ..................................... 21187636

(51) Int. Cl.
*F01D 25/18* (2006.01)
*F01D 9/06* (2006.01)
(Continued)

(52) U.S. Cl.
CPC ............. *F01D 25/183* (2013.01); *F01D 9/06* (2013.01); *F01D 11/005* (2013.01); *F01D 25/16* (2013.01);
(Continued)

(58) Field of Classification Search
CPC ...... F01D 25/183; F01D 25/16; F01D 25/125; F01D 9/16; F01D 11/005; F01D 11/06;
(Continued)

(56) References Cited

U.S. PATENT DOCUMENTS 3,180,568 A * 4/1965 Oettle ....................... F02C 6/12
277/423
4,250,711 A * 2/1981 Zehnder ................. F02M 26/23
60/278
(Continued)

FOREIGN PATENT DOCUMENTS

CN 107810315 A * 3/2018 ............. F01N 3/021
CN 108699917 A * 10/2018 ............ F01D 11/003
(Continued)

OTHER PUBLICATIONS

Extended European Search Report in corresponding European Application No. 21187636.2 dated Oct. 4, 2021 (8 pages).

*Primary Examiner* — David E Sosnowski
*Assistant Examiner* — Wayne A Lambert
(74) *Attorney, Agent, or Firm* — Venable LLP; Jeffri A. Kaminski (57) ABSTRACT

An internal combustion engine, ICE, system, includes a turbocharger having a turbine and a compressor for compressing intake air and feeding the intake air to the ICE. A turbo turbine unit is disposed in an exhaust gas path downstream the turbocharger to receive exhaust gas from the turbocharger. The turbo turbine unit having a turbine wheel, a bearing housing defining an inside volume for containing lubrication oil, and a sealing arrangement positioned in the vicinity of the turbine wheel for preventing lubrication oil from escaping from the inside volume of the bearing housing to an exhaust duct of the turbo turbine unit. A buffer air conduit extends between a selected position at the compressor and a buffer air inlet of the turbo turbine unit. The buffer air inlet is in fluid communication with a buffer air channel inside the turbo turbine unit to direct buffer air to a position in-between axially opposite arranged annular sealing mem-
(Continued)

bers to provide a counter-pressure against at least one of the annular sealing members.

16 Claims, 6 Drawing Sheets

(51) Int. Cl.
*F01D 11/00* (2006.01)
*F01D 25/16* (2006.01)
(52) U.S. Cl.
CPC ...... *F05D 2220/40* (2013.01); *F05D 2260/60* (2013.01); *F05D 2260/98* (2013.01)
(58) Field of Classification Search
CPC .......... F01D 11/04; F01D 9/06; F01D 11/003; F04D 25/02; F04D 25/024; F02B 37/02; F02B 37/004; F02B 41/10; F02B 39/14; F02C 6/08; F05D 2240/40; F05D 2240/15; F05D 2240/581; F05D 2260/60; F05D 2260/98; Y02T 10/12
See application file for complete search history.

(56) References Cited

U.S. PATENT DOCUMENTS

| | | | | |
|---|---|---|---|---|
| 4,343,591 A | * | 8/1982 | Hannan, III | ......... F04D 29/102 |
| | | | | 415/168.2 |
| 5,156,522 A | * | 10/1992 | Tessier | ................. F04D 29/445 |
| | | | | 415/58.4 |
| 5,406,796 A | * | 4/1995 | Hiereth | .................. F02M 26/14 |
| | | | | 60/606 |
| 5,488,823 A | * | 2/1996 | Faulkner | ..................... F02C 6/10 |
| | | | | 60/785 |
| 8,915,708 B2 | | 12/2014 | Yang et al. | |
| 8,961,151 B2 | | 2/2015 | Patel et al. | |
| 2004/0112054 A1 | | 6/2004 | Larsson et al. | |
| 2005/0188694 A1 | * | 9/2005 | Frankenstein | ........ F01D 25/183 |
| | | | | 277/420 |
| 2007/0107438 A1 | * | 5/2007 | Morimoto | ............... F01D 11/06 |
| | | | | 60/785 |
| 2010/0037855 A1 | | 2/2010 | French | |
| 2012/0328418 A1 | | 12/2012 | Yang et al. | |
| 2015/0292345 A1 | | 10/2015 | Giselmo et al. | |
| 2015/0330253 A1 | * | 11/2015 | Koch | .................... F01D 25/005 |
| | | | | 415/170.1 |
| 2017/0241330 A1 | * | 8/2017 | Eriksson | ............... F16D 25/082 |
| 2017/0284224 A1 | | 10/2017 | Ekstrand | |
| 2019/0338732 A1 | * | 11/2019 | Klima | .................. F02D 23/005 |

FOREIGN PATENT DOCUMENTS

| | | | |
|---|---|---|---|
| DE | 202015007276 U1 | * | 3/2017 |
| EP | 1063390 A2 | | 12/2000 |
| EP | 1063390 A3 | | 8/2003 |
| WO | WO-2014000867 A1 | * | 1/2014 ............. F01D 25/16 |

* cited by examiner

INTERNAL COMBUSTION ENGINE SYSTEM

TECHNICAL FIELD

The disclosure relates to an internal combustion engine system. The disclosure also relates to a vehicle comprising such internal combustion engine system. The disclosure can typically be applied in heavy-duty vehicles, such as trucks, buses and construction equipment. Although the disclosure will be described with respect to a truck it is not restricted to this particular vehicle but may also be used in other vehicles, marine vessels and also in various stationary applications.

BACKGROUND

There is a general desire for improving internal engine combustion systems with regard to performance, efficiency, exhaust gas aftertreatment, etc. One example of an ordinary component for an internal combustion engine system is a turbocharger arrangement. The turbocharger typically includes a compressor and a turbine, where intake air is compressed by means of the compressor operatively connected to the turbine, which is driven by engine exhaust gas. However, challenges may arise when implementing different types of turbine units on diesel internal combustion engines. There is thus a desire to further improve internal combustion engine systems comprising a turbocharger arrangement.

US 2015/0292345 A1 discloses another type of internal combustion engine system comprising a power turbine unit having a turbine housing, an exhaust duct, a turbine wheel with blades positioned in the exhaust duct, a shaft rigidly connected to the turbine wheel and rotatably supported in the housing, and an oil sealing system. The oil sealing system includes a sealing arrangement positioned in the vicinity of the turbine wheel for preventing oil from escaping from the turbine housing along the shaft to the exhaust duct. The oil sealing system further includes a buffer gas duct that is arranged to supply exhaust gas from the exhaust duct to the sealing arrangement for pressurizing the sealing arrangement.

The combination of power turbine unit and diesel internal combustion engine system has an interesting potential for improving the operations of an internal engine combustion system. However, there is still a need for further improvements of such internal combustion engine systems.

SUMMARY

An object of the disclosure is to provide an improved internal combustion engine system comprising a turbocharger and a turbo turbine unit.

According to a first aspect of the disclosure, there is provided an internal combustion engine, ICE, system. The ICE system comprises an internal combustion engine, ICE; a turbocharger receiving exhaust gases from the ICE, the turbocharger having a turbine and a compressor for compressing intake air and feeding the intake air to the ICE; a turbo turbine unit disposed in an exhaust gas path downstream the turbocharger and arranged to receive exhaust gas from the turbocharger; the turbo turbine unit having a turbine wheel, a bearing housing defining an inside volume for containing lubrication oil, and a sealing arrangement positioned in the vicinity of the turbine wheel for preventing lubrication oil from escaping from the inside volume of the bearing housing to an exhaust duct of the turbo turbine unit. Moreover, the ICE system comprises a buffer air conduit extending between a selected position in or at the compressor of the turbocharger and a buffer air inlet of the turbo turbine unit. The buffer air inlet is arranged in fluid communication with a buffer air channel arranged inside the turbo turbine unit and adapted to direct buffer air to a position in-between axially opposite arranged annular sealing members of the sealing arrangement so as to provide a counter-pressure against at least one of the annular sealing members.

The proposed ICE system is based on the insight that there is a need for a reliable sealing of a turbo turbine unit shaft, such as a turbo compound, TC, shaft of a TC unit to operate with a counter-pressure to avoid that exhaust gases enter the TC bearing and/or avoid that oil from the inside of the bearing housing of the TC unit can escape into the exhaust gas path, potentially causing damage to an exhaust aftertreatment system or unnecessary pollution. However, it may not always be easy to determine the pressure needed for the buffer air function in other places of the TC unit and/or the ICE system. By supplying buffer air from the selected position of the compressor to the TC unit via the buffer air conduit, it becomes possible to provide an adequate pressure to the TC unit without using a specific control valve such as a buffer air valve unit (also commonly known as a buffer valve unit, BVU). A BVU may often be installed and used in conventional systems for providing buffer air to the TC unit from a charge air cooler device, vehicle air system or the like.

As such, the proposed ICE system provides for supplying buffer air to the turbo turbine unit, such as the TC unit, and regulating the pressure of the buffer air in a more efficient and simple manner than the available prior art systems. In addition, the proposed ICE system allows for creating the desired and correct pressure directly when the ICE is started, i.e. during the process of building-up the needed pressure at the compressor of the turbocharger. The proposed ICE system also provides a more robust arrangement because there is no need for a control valve as the desired pressure is provided by the nature of the turbine of the turbocharger. In this context, it may be noted that such control valves may be sensitive to contamination and may also require a non-return valve to prevent exhaust gas and/or oil to travel up the buffer air conduit and into the valve.

The proposed ICE system may further have a positive impact on the manufacturing costs due to the possibility of providing a system without any explicit BVU. While the proposed ICE system may be particularly suitable for systems comprising a TC unit, it may also be applicable for systems including a low-pressure turbocharger having an axial turbine wheel. However, for ease of reference, the following examples and advantages refer to an ICE system comprising the TC unit.

The purpose with providing buffer air, as described herein, is to maintain a positive air flow into the bearing housing of the TC unit during the entire operation cycle, but particularly during start-up of the ICE. By providing a counter-pressure against the annular sealing members, the buffer air is used to pressurize the sealing arrangement and also to provide a counter-pressure against the exhaust gases to avoid oil leakage. More specifically, the turbine wheel rotates with a significant speed, for example up to about 50 000 rpm, thereby generating a reduced exhaust gas pressure at a radially inner region of the turbine wheel compared to the exhaust gas pressure at a radially outer region of the turbine wheel. This difference in exhaust gas pressure is caused by centrifugal forces acting on the exhaust gas located close to the turbine wheel. At the same time, the oil mist pressure at the inner side of the housing varies with oil sump pressure etc., and is during certain operating conditions higher than the exhaust gas pressure at the inner region of the turbine wheel. This pressure difference may generate an oil leakage out from the inside of the housing into the exhaust gas stream. The leaked oil then blends with the exhaust gas causing increased emissions, increased lubrication oil consumption, and/or poisoning of the exhaust aftertreatment system.

By the arrangement of the buffer air conduit between the TC unit and the compressor of the turbocharger, it becomes possible to at least increase the chances that the sealing arrangement has a pressure above the oil mist pressure at the inner side of the housing to effectively prevent any oil leakage along the shaft.

While the pressure of the buffer air supplied by the compressor may vary for different types of ICE systems, it may occasionally be sufficient with a few kPa higher pressure between the seals compared to the pressure in the bearing housing at all conditions. By way of example, the pressure of the buffer air supplied by the compressor pressure may be about 50 kPa. Generally, the desired (correct) pressure may be obtained directly when the ICE is started, i.e. during the process of building-up the wanted pressure at the compressor.

The turbocharger of the ICE system may generally refer to a well-known arrangement, in which the turbine of the turbocharger is arranged to receive exhaust gases from the ICE and the compressor is configured to compress intake air and feed the compressed intake air via an air intake line to the ICE, while the turbine being configured to convert engine exhaust gas into mechanical energy to drive the compressor.

According to an example embodiment, the buffer air channel extends from the buffer air inlet arranged at an outer periphery of the turbo turbine unit and through a solid part of the bearing housing of the turbo turbine unit. Hereby, there is provided a simple, yet robust arrangement of the buffer air channel in the turbo turbine unit.

According to an example embodiment, the buffer air channel of the turbo turbine unit is in direct fluid communication with the selected position in or at the compressor via the buffer air conduit. By way of example, the buffer air conduit is devoid of a control valve for controlling the pressure of the buffer air.

According to an example embodiment, the turbo turbine unit comprises a turbine shaft arranged to carry the turbine wheel. The shaft is supported in the bearing housing by a bearing assembly. The bearing assembly may comprise one or more bearing elements. In other words, the turbo turbine unit may comprise a turbine housing, an exhaust duct, a turbine wheel with blades positioned in the exhaust duct, and the turbine shaft being rigidly connected to the turbine wheel and rotatably supported in the bearing housing by the bearing assembly.

According to an example embodiment, the sealing arrangement is arranged to prevent lubrication oil from escaping from the inside of the bearing housing along the turbine shaft into the exhaust gas stream. The exhaust gas stream may typically pass past the turbine wheel.

According to an example embodiment, the sealing arrangement is a spring-tensioned sealing arrangement, comprising corresponding radially biased annular sealing members to maintain the sealing arrangement in axial position by friction forces between the annular sealing members and the bearing housing. By way of example, the biased sealing rings are expanded and thus relying on friction between the annular sealing members and the bearing housing to prevent axial movement.

According to an example embodiment, the turbine shaft comprises a step bore arranged axially outside at least one of the annular sealing members. The step bore is arranged to prevent the annular sealing members from moving axially. The slightly smaller diameter of the step will capture the annular sealing members in cases of degraded annular sealing members.

According to an example embodiment, the ICE system further comprises an aftertreatment system disposed in the exhaust gas stream downstream the turbo turbine unit.

According to an example embodiment, the turbocharger and the turbo turbine unit are arranged in series.

According to an example embodiment, the turbine wheel of the turbo turbine unit is an axial-flow turbine wheel. In such arrangement, exhaust gas leaving an outlet of the turbocharger is directed to an axial-flow turbine wheel of the turbo turbine unit. The exhaust gas exhibits a pressure drop and temperature decrease, which is converted by the turbine wheel into kinetic energy that is supplied to the engine crankshaft.

The turbo turbine unit may be a turbo-compound, TC, unit. Alternatively, the turbo turbine may be a part of a low-pressure turbocharger unit. In such examples, the ICE system comprises the low-pressure turbocharger unit. The low-pressure turbocharger unit is arranged downstream the turbine of the other turbocharger system, that may thus generally be a high-pressure turbocharger system.

According to an example embodiment, the compressor of the turbocharger is a centrifugal compressor.

According to an example embodiment, the selected position in or at the centrifugal compressor is any one of a position in or at a shroud portion, a diffusor and a volute portion of the centrifugal compressor.

According to an example embodiment, the selected position is at a radial position in a compressor housing relative to an axial centre line of the compressor. According to an example embodiment, the centrifugal compressor further comprises a radial tap arranged at a selected radius, and configured to connect the buffer air conduit to the compressor. By arranging the tap in the turbocharger compressor housing on a suitable radius, it becomes possible to achieve an even more suitable pressure at the TC unit turbine seals, i.e. a pressure between a lower critical pressure and a higher critical pressure. A too low pressure may allow oil to escape, while a high pressure may cause unnecessary losses or wear on the sealing rings because the pressure may exert a radially outwardly force on the sealing rings (and may thus wear against any groove in the turbine shaft).

The internal combustion engine system may typically comprise an internal combustion engine having a plurality of cylinders, each of which being provided with an air inlet valve and an exhaust gas valve; a fuel supply system configured to supply fuel to the cylinders; an air intake system and an exhaust gas system. The turbocharger arrangement comprises the intake air compressor arranged in the air intake system and an exhaust gas turbine arranged in the exhaust gas system, wherein the intake air compressor is operatively connected to the exhaust gas turbine. Optionally, a controllable gas feeding device may be arranged in the air intake system downstream the intake air compressor; an exhaust gas aftertreatment system arranged downstream the exhaust gas turbine; and a wastegate arranged to allow exhaust gas to bypass the exhaust gas turbine.

According to a second aspect of the disclosure, there is provided a vehicle comprising an internal combustion engine system according to the first aspect of the disclosure. The ICE system is arranged to provide power propulsion of the vehicle, wherein the internal combustion engine system is arranged according to the above. Effects and features of the second aspect are largely analogous to those described above in relation to the first aspect. In particular, the vehicle is a heavy-duty vehicle, such as a truck, bus or a construction equipment.

According to one example embodiment, the ICE system is operable by a control unit. The control unit may be a single control unit, or a number of control units interconnected and collaborating in a distributed network forming a distributed control unit. According to an example embodiment, the control unit is operable to control the compressor to supply pressurized buffer air from the compressor to the space via the buffer air conduit during a start-up sequence of the ICE. It should be noted that the desired (correct) pressure may be obtained directly when the ICE is started, i.e. during the process of building-up the wanted pressure at the compressor. Hence, the supply of buffer air from the compressor to the turbo turbine unit is performed in a passive manner during the process of building-up the wanted pressure without any need for control valves. It should be noted that the control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device. The control unit may be arranged in the ICE system or in another remote location of the vehicle. Thus, the vehicle comprises the control unit. In addition, or alternatively the control unit may be a part of an electronic control unit, ECU, of the vehicle.

Further features of, and advantages will become apparent when studying the appended claims and the following description. The skilled person will realize that different features may be combined to create embodiments other than those described in the following, without departing from the scope of the present disclosure.

The terminology used herein is for the purpose of describing particular examples only and is not intended to be limiting of the disclosure. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

BRIEF DESCRIPTION OF THE DRAWINGS

With reference to the appended drawings, below follows a more detailed description of embodiments of the disclosure cited as examples.

In the drawings.

DETAILED DESCRIPTION OF EXAMPLE EMBODIMENTS OF THE DISCLOSURE

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference character refer to like elements throughout the description.

Figure 1:
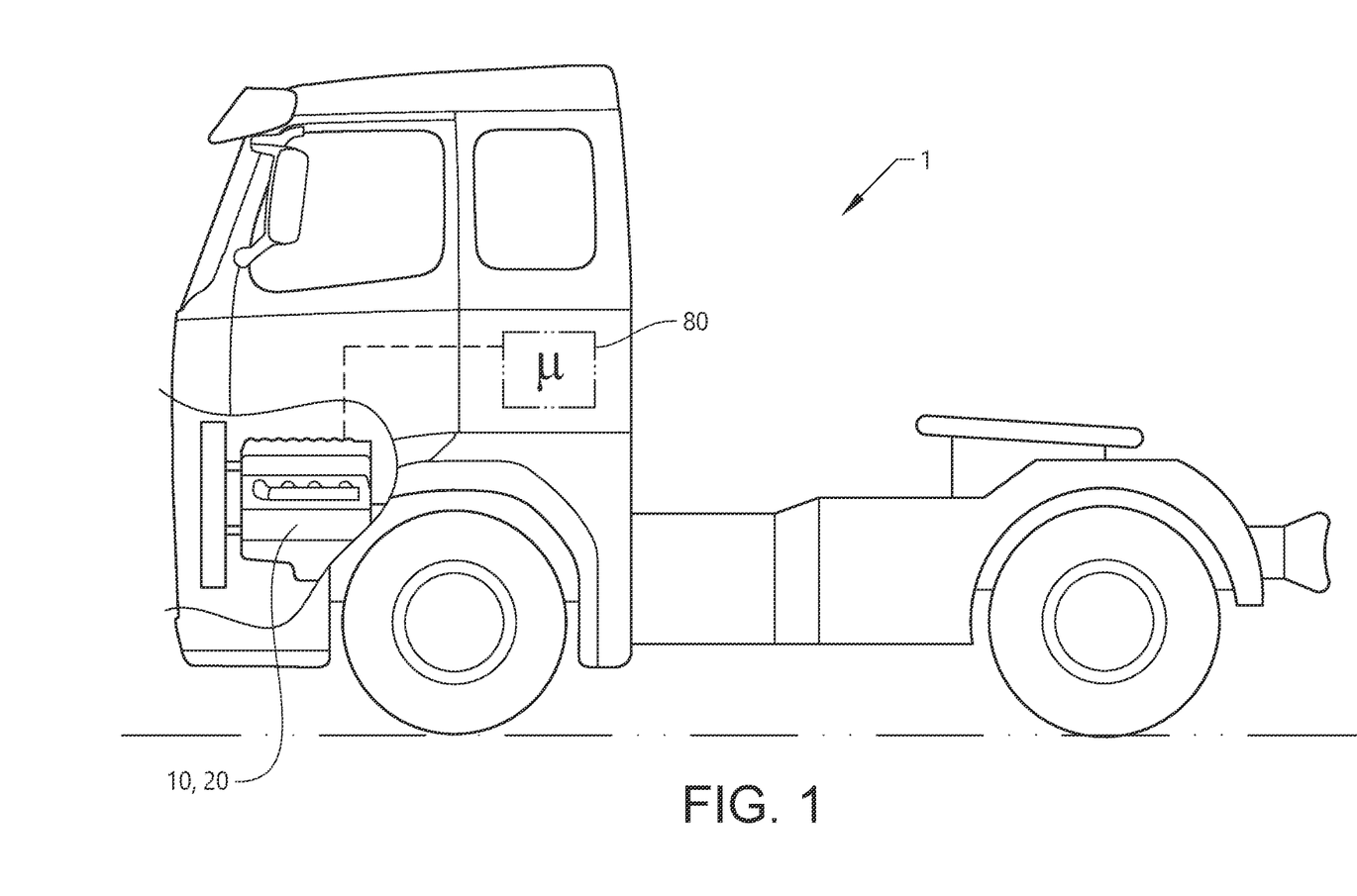
FIG. 1 is a schematic view of a truck provided with an example of an internal combustion engine system according to the disclosure.

FIG. 1 shows a schematic view of a truck 1 provided with an internal combustion engine system 10 according to the disclosure. The internal combustion engine system comprises an internal combustion engine 20, herein also denoted as the ICE 20. Further, the ICE system 10 comprises a control unit 80 configured to send and receive control signals, sensor signals, etc. and to control the components and operations of the ICE system as further described herein. The control unit 80 may be an electronic control unit, ECU, of the ICE system. The control unit 80 is further configured to store and have access to various engine system operational data, to make calculations and predictions etc., as is ordinarily known in the art.

Figure 2:
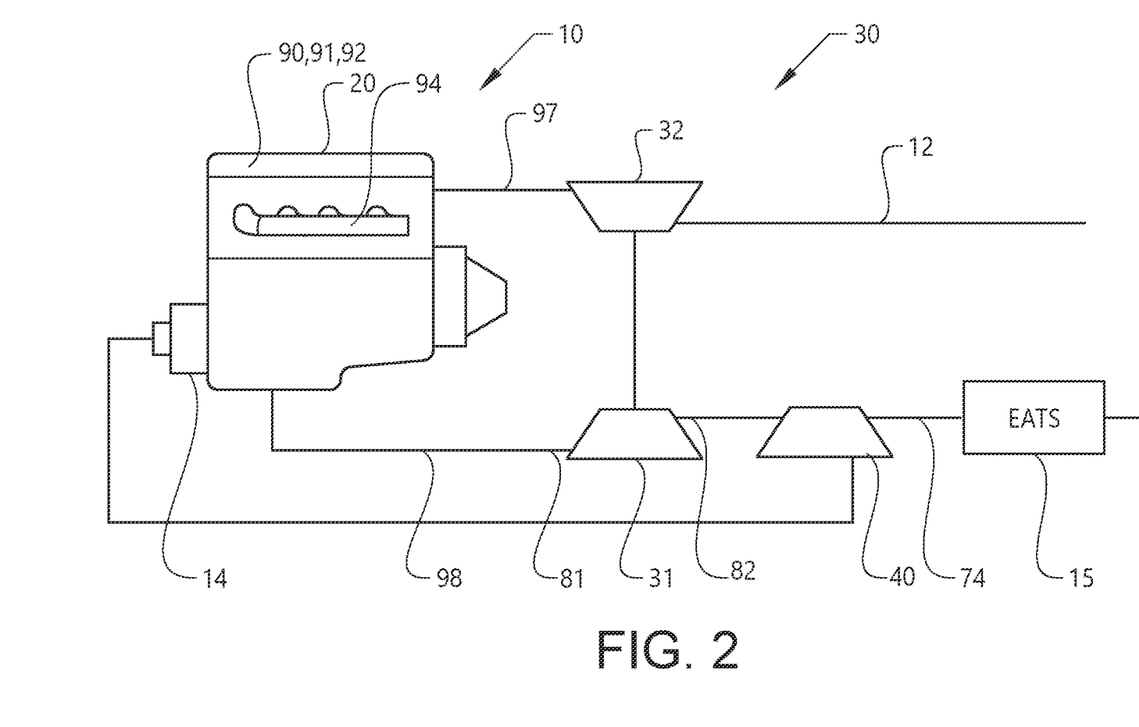
FIGS. 2 and 3 are schematic views of an example embodiment of the internal combustion engine system according to FIG. 1, comprising a turbocharger and a turbo-compound unit.

FIG. 2 shows a schematic view of an example embodiment of the ICE system 10 according to FIG. 1. The exemplified ICE system 10 in FIG. 2 comprises the ICE 20. Although not explicitly illustrated, the ICE 20 comprises a number of cylinders 90, each of which being provided with an air inlet valve 91 and an exhaust gas valve 92. Each cylinder is further provided with a reciprocating piston (not shown) operatively connected to a crankshaft 14 of the ICE 20.

The ICE system 10 comprises an air intake system 97 and an exhaust gas system 98, as depicted in FIG. 2. Also, as illustrated in FIG. 2, the ICE system 10 comprises a fuel supply system 94 configured to supply fuel to the cylinders. FIG. 2 further illustrates an overview of an arrangement comprising an upstream turbocharger 30 connected to a downstream turbo turbine unit 40. The turbo turbine unit is here a so-called turbo-compound, TC, unit 40. The turbo-compound unit 40 comprises a turbine, as further described herein. For ease of reference, the turbo turbine unit may thus in the following be denoted as the turbo-compound unit, or simply as the TC unit 40. The turbocharger 30 and the TC unit 40 are arranged in series, and further described in more detail in relation to FIGS. 3 to 6.

Figure 4:
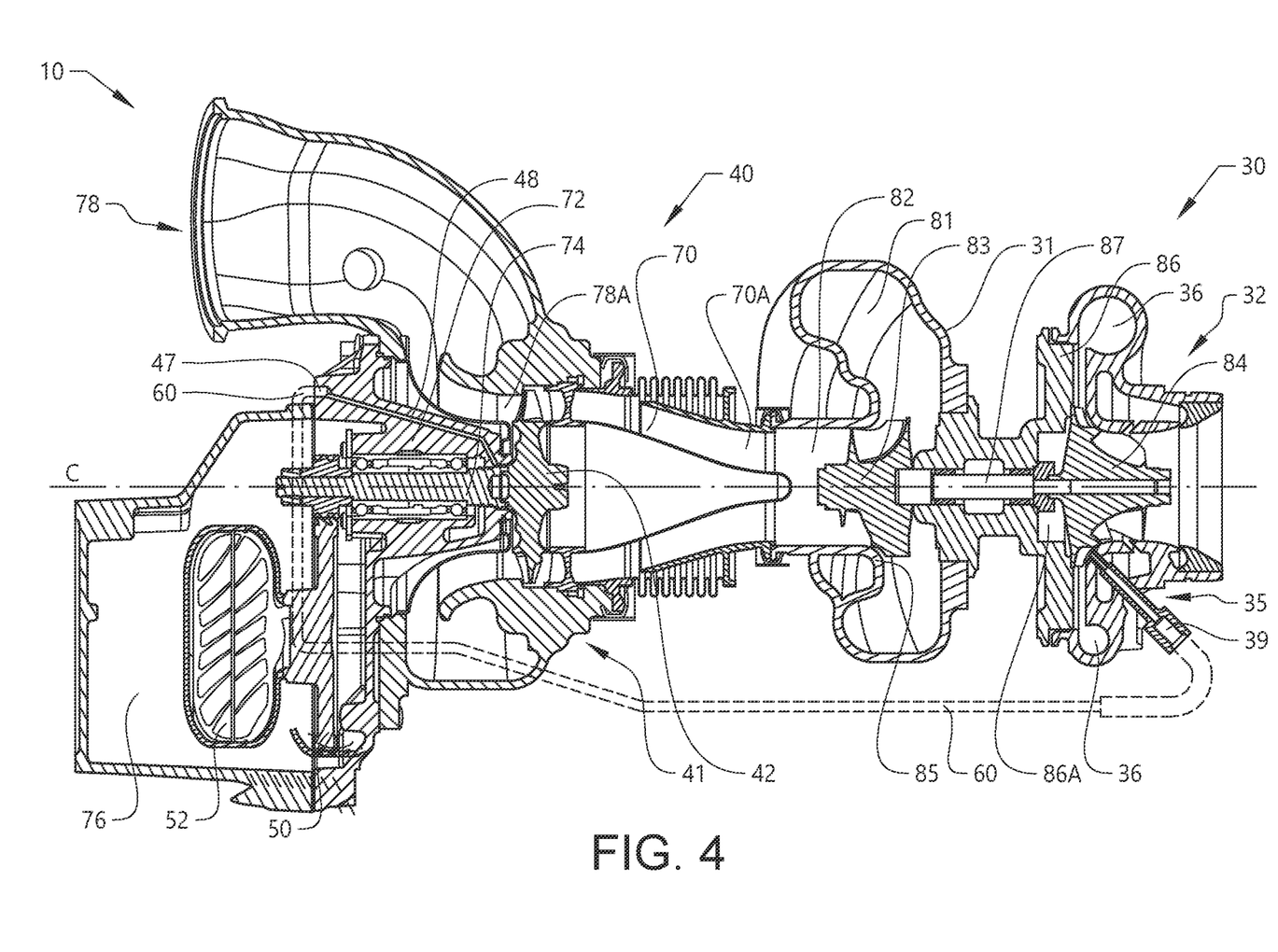
FIG. 4 is a cross-sectional schematic view of the example embodiment of the internal combustion engine system according to FIGS. 2 and 3, comprising a turbocharger and a turbo-compound unit.

As illustrated in FIG. 2, in combination with FIG. 4, illustrating a cross-sectional view of the arrangement, the turbocharger 30 is arranged to receive exhaust gases from the ICE 20. The turbocharger 30 receives exhaust gases from the ICE 20 exhaust gas system 98. The turbocharger 30 comprises an exhaust gas inlet 81 and an exhaust gas outlet 82. The exhaust gas inlet 81 is in fluid communication with the exhaust gas system 98 of the ICE 20. The exhaust gas outlet 82 is in fluid communication with the TC unit 40.

As depicted in FIG. 2 and FIG. 4, the turbocharger 30 comprises a turbine 31. By way of example, the turbine 31 is powered by exhaust gas from the ICE 20. The exhaust gas may exhibit a first pressure and temperature drop between the exhaust gas inlet 81 and exhaust gas outlet 82 of the turbocharger, which pressure drop is converted by a turbocharger turbine wheel 83 into kinetic energy that is driving a turbocharger compressor wheel 84 (FIG. 4), which feeds compressed air to the ICE 20.

Moreover, as illustrated in e.g. FIG. 4, the turbocharger 30 comprises a compressor 32 for compressing intake air and feeding the intake air to the ICE 20. The compressor 32 is thus in fluid communication with the ICE air intake system 97. The compressor 32 is also in fluid communication with an air inlet 12, as illustrated in FIG. 2. The compressor 32 is thus an intake air compressor arranged in the air intake system 97 and the turbine 31 is an exhaust gas turbine arranged in the exhaust gas system 98. By way of example, the compressor of the turbocharger is a centrifugal compressor 32. The intake air centrifugal compressor 32 is operatively connected via a shaft 87 to the exhaust gas turbine 31 (FIG. 4). The turbocharger 30 is here a conventional turbocharger comprising a turbine wheel housing 85, a compressor wheel housing 86, and the shaft 87 rotationally connecting the turbine wheel 83 and the compressor wheel 84 (FIG. 4).

As illustrated in FIG. 2, the ICE system 10 further comprises an aftertreatment system 15. The aftertreatment system is here a so-called exhaust gas aftertreatment system, EATS. The EATS 15 is disposed in the exhaust gas stream downstream the TC unit 40. However, in other ICE systems, the EATS may be disposed upstream the TC unit 40. The EATS is typically also arranged downstream the exhaust gas turbine 31. The ICE system may further include a wastegate (not illustrated) arranged to allow exhaust gas to bypass the exhaust gas turbine 31. The EATS may contain catalytic converters and similar components for treating the exhaust gas.

Figure 3:
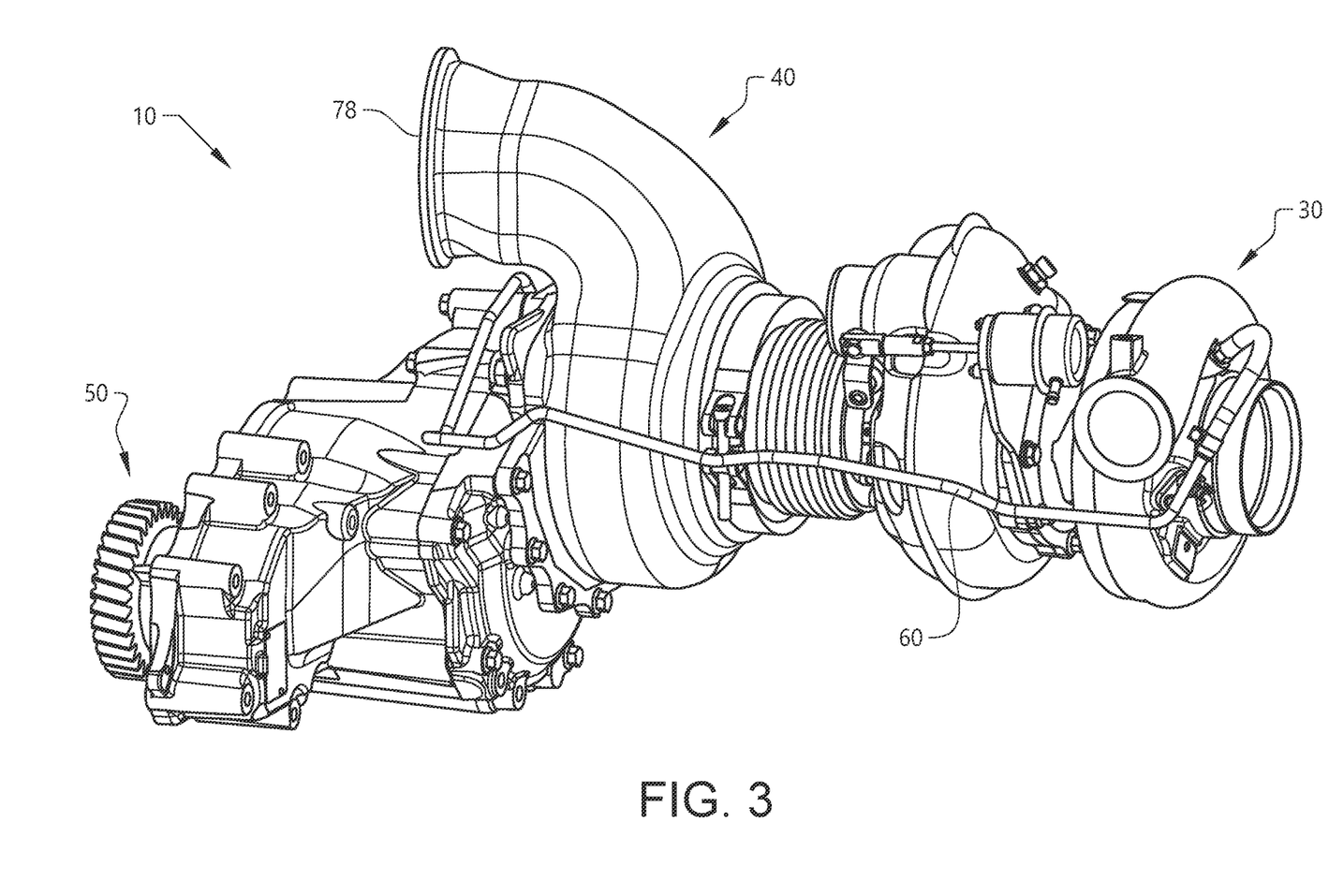

Moreover, as illustrated in FIGS. 2 to 3, the ICE system 10 comprises the turbo-compound, TC, unit 40 disposed in an exhaust gas path downstream the turbocharger 30 and arranged to receive exhaust gas from the turbocharger 30. The turbo-compound unit 40 is arranged and configured to convert energy of an exhaust gas from the ICE to a torque increase of the crankshaft 14 of the ICE. Turning again to the TC unit 40 and FIGS. 2 and 3, the TC unit comprises a turbine wheel 42. By way of example, the turbine wheel of the TC unit is an axial-flow turbine wheel 42.

In other words, the exhaust gas supplied from the turbocharger 30 is used to drive the turbine 42 of the TC unit 40. The rotation of the turbine 42 will then be transmitted via one or more reduction gears 50 (FIGS. 3 and 4) to the crankshaft 14 of the ICE 20 (FIG. 2).

In operation, exhaust gas leaving the outlet 82 of the turbine 31 of the turbocharger 30 is directed to the axial-flow turbine wheel 42 of the TC unit 40. The exhaust gas exhibits a second pressure drop and temperature decrease between an inlet 70 and an outlet 78 of the TC unit 40, which pressure drop is converted by the turbine wheel 42 into kinetic energy that is supplied to the crankshaft 14 via the rotational shaft 74, drive gear 50, gear train and a fluid coupling 52.

In addition, the TC unit 40 comprises a bearing housing 72. As illustrated in e.g. FIG. 4, the bearing housing at least partly defines an inside volume for containing lubrication oil. The bearing housing 72 thus contains the lubrication oil. The bearing housing 72 is also adapted to house a number of internal components of the TC unit, as described herein and illustrated in e.g. FIG. 4. Typically, the TC unit 40 also comprises an exhaust duct 78A for conveying exhaust gas from the inlet 70 to an annular collector portion (although not explicitly shown). The turbine wheel 42 is positioned in the exhaust duct 78A. Generally, the TC unit 40 further comprises an exhaust collector 41, as illustrated in FIG. 4.

Figure 5:
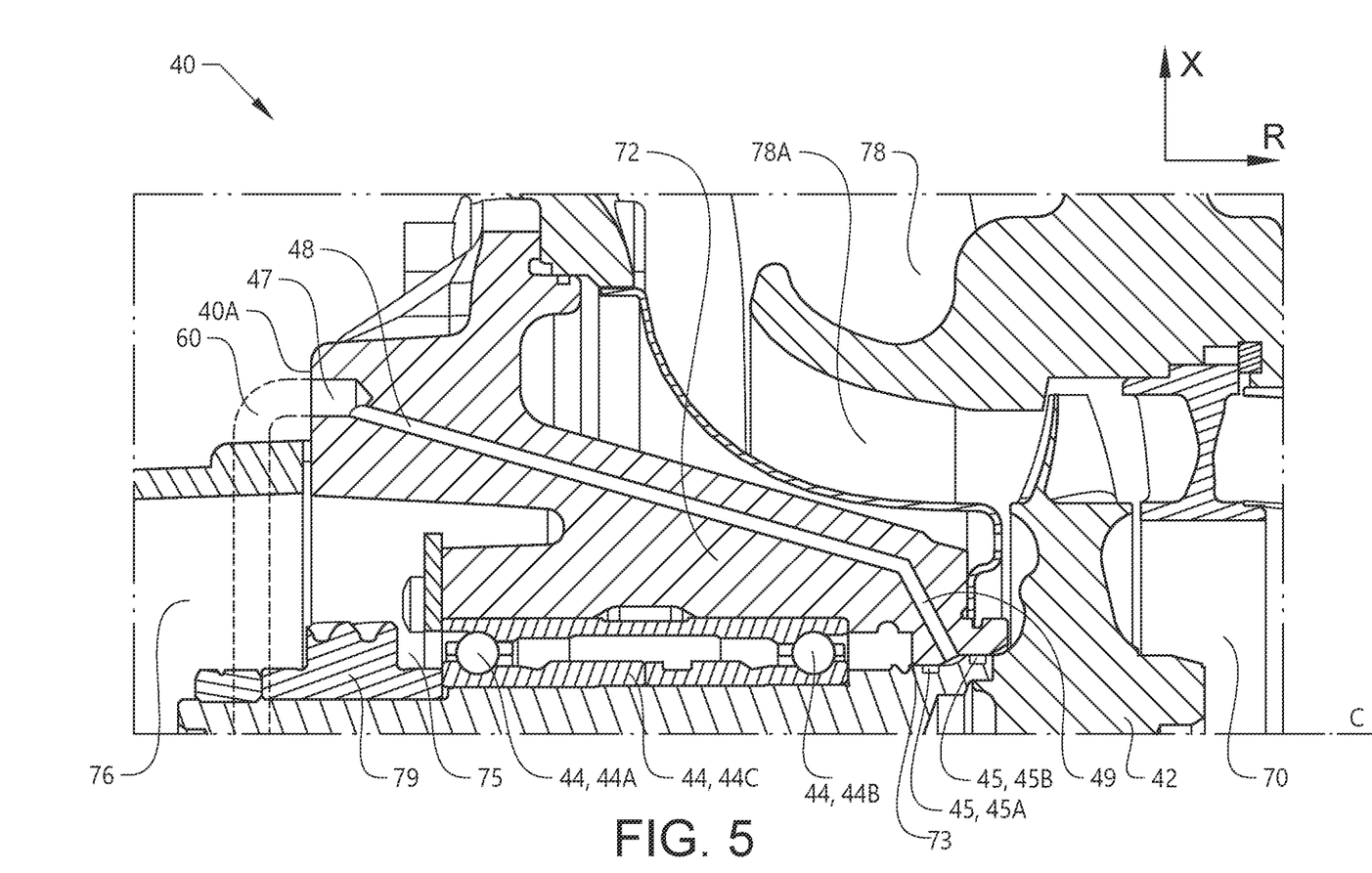
FIG. 5 is an enlarged cross-sectional schematic view of the turbo-compound unit in FIGS. 1 to 4.

As depicted in FIG. 4, and also in FIG. 5, the TC unit 40 comprises the turbine shaft 74 arranged to carry the turbine wheel 42. The shaft 74 is supported in the bearing housing 72 by a bearing assembly 44 having one or more bearings elements 44, 44A, 44B. The bearing elements 44A, 44B may be arranged in a bearing cartridge 44C. The shaft 74 is rigidly connected to the turbine wheel 42 and rotatably supported in the bearing housing 72 by means of the bearings, e.g. in the form of slide or rolling bearing elements. Lubrication oil channels are provided in the bearing housing 72 for feeding lubrication oil to the bearing elements, and a hollow inside 76 of the bearing housing 72 is connected to the wet sump lubrication system of the combustion engine, see e.g. FIG. 5.

Further, the TC unit 40 comprises a sealing arrangement 45 positioned in the vicinity of the turbine wheel 42 for preventing lubrication oil from escaping from the inside volume of the bearing housing 72 to the exhaust duct 78 of the TC unit 40. Typically, the sealing arrangement 45 is arranged to prevent lubrication oil from escaping from the inside volume 75 of the bearing housing 72 along the turbine shaft 74 into the exhaust gas stream, which passes past the turbine wheel 42.

The sealing arrangement 45 is arranged about the turbine shaft 74. The turbine shaft 74 extends in an axial direction A. As illustrated in FIG. 4, the sealing arrangement 45 comprises a pair of axially opposite arranged annular sealing members 45A and 45B. In this context, the term axially opposite refers to opposite positions along the axial direction of the turbine shaft 74. Hence, the annular sealing members 45A and 45B are arranged about the turbine shaft and axial-spaced apart in the axial direction of the turbine shaft. The pair of axially opposite arranged annular sealing members 45A and 45B is arranged about the turbine shaft 74, as is commonly known in the art. By way of example, the sealing arrangement 45 is a spring-tensioned sealing arrangement, comprising corresponding radially outer biased sealing rings 45A and 45B (FIG. 5) to maintain the sealing arrangement in axial position by friction forces between the annular sealing members and the bearing housing 72. The radially outer biased sealing rings 45A and 45B are expanded. Thereby, the sealing arrangement is arranged to seal by means of friction between the provided seals between the radially outer biased sealing rings 45A and 45B and the bearing housing to prevent axial movement.

Optionally, the turbine shaft 74 comprises a step bore 73 arranged axially outside at least one of the annular sealing members 45A, as illustrated in FIG. 5. The step bore(s) is arranged to prevent the annular sealing rings 45A and 45B from moving axially. The slightly smaller diameter of the steps will capture the annular sealing rings 45A and 45B after some initial wear.

Moreover, the turbine wheel 42 rotates with a significant speed, for example up to about 50 000 rpm, thereby generating a reduced exhaust gas pressure at a radially inner region of the turbine wheel 42 compared to the exhaust gas pressure at an outer region of the turbine wheel 42. This difference in exhaust gas pressure is caused partly by centrifugal forces acting on the exhaust gas located close the turbine wheel 42. At the same time, the oil mist pressure at an inner side of the bearing housing 72 varies with oil sump pressure and is during certain operating conditions higher than the exhaust gas pressure at the inner region of the turbine wheel 42. This pressure difference may generate an oil leakage out from the inside 75 of the bearing housing 72 into the exhaust gas stream. The leaked oil then blends with the exhaust gas causing increased emissions, increased lubrication oil consumption, poisoning of the exhaust aftertreatment system.

In order to handle the above potential oil leakage, compressed buffer gas can be used for pressurizing the sealing arrangement. The pressurisation of the sealing arrangement 45 is provided by supplying pressurised buffer air from a selected position from the compressor 32 of the turbocharger 30 via a buffer air conduit 60, as illustrated in FIG. 3, and further in FIGS. 4 to 6. Such arrangement is particularly useful for mitigating oil leakage during certain operating conditions. One example of a certain operating condition is low engine load in combination with high turbine wheel speed. However, other operating conditions may also result in undesired oil leakage.

Accordingly, as illustrated in FIG. 3, the ICE system 10 comprises the buffer air conduit 60. The buffer air conduit 60 extends between a selected position 35 (see FIG. 6) in or at the compressor 32 of the turbocharger 30 and a buffer air inlet 47 of the TC unit 40. Thus, the TC unit 40 comprises the buffer air inlet 47.

The buffer air conduit 60 is typically made of a steel tube, or similar suitable metal alloy. The buffer air conduit 60 is secured to the TC unit bearing housing 72 by at least one fastener. The fastener can be a bolt arrangement or the like, although not explicitly illustrated.

In addition, the TC unit 40 comprises an inside buffer air channel 48, as illustrated in FIG. 3. The buffer air inlet 47 is arranged in fluid communication with the buffer air channel 48 arranged inside the TC unit 40. The buffer air channel 48 is adapted to direct buffer air to a position (FIG. 5) in-between the axially opposite arranged annular sealing members 45a, 45b of the sealing arrangement 45 so as to provide a counter-pressure against at least one of the annular sealing members. Typically, the buffer air channel 48 comprises an interface inlet 49, as illustrated in FIG. 5, for supplying the buffer air to the position in-between the axially opposite arranged annular sealing members 45a, 45b of the sealing arrangement 45.

As illustrated in FIGS. 4 and 5, the buffer air channel 48 extends from the buffer air inlet 47 arranged at an outer periphery 40A of the TC unit 40 and through a solid part of the bearing housing 72 of the TC unit 40. By this arrangement of the buffer air conduit 60 between the TC unit 40 and the compressor 32 of the turbocharger 30, the buffer air channel 48 of the TC unit is in direct fluid communication with the selected position 35 in or at the compressor via the buffer air conduit 60.

Figure 6:
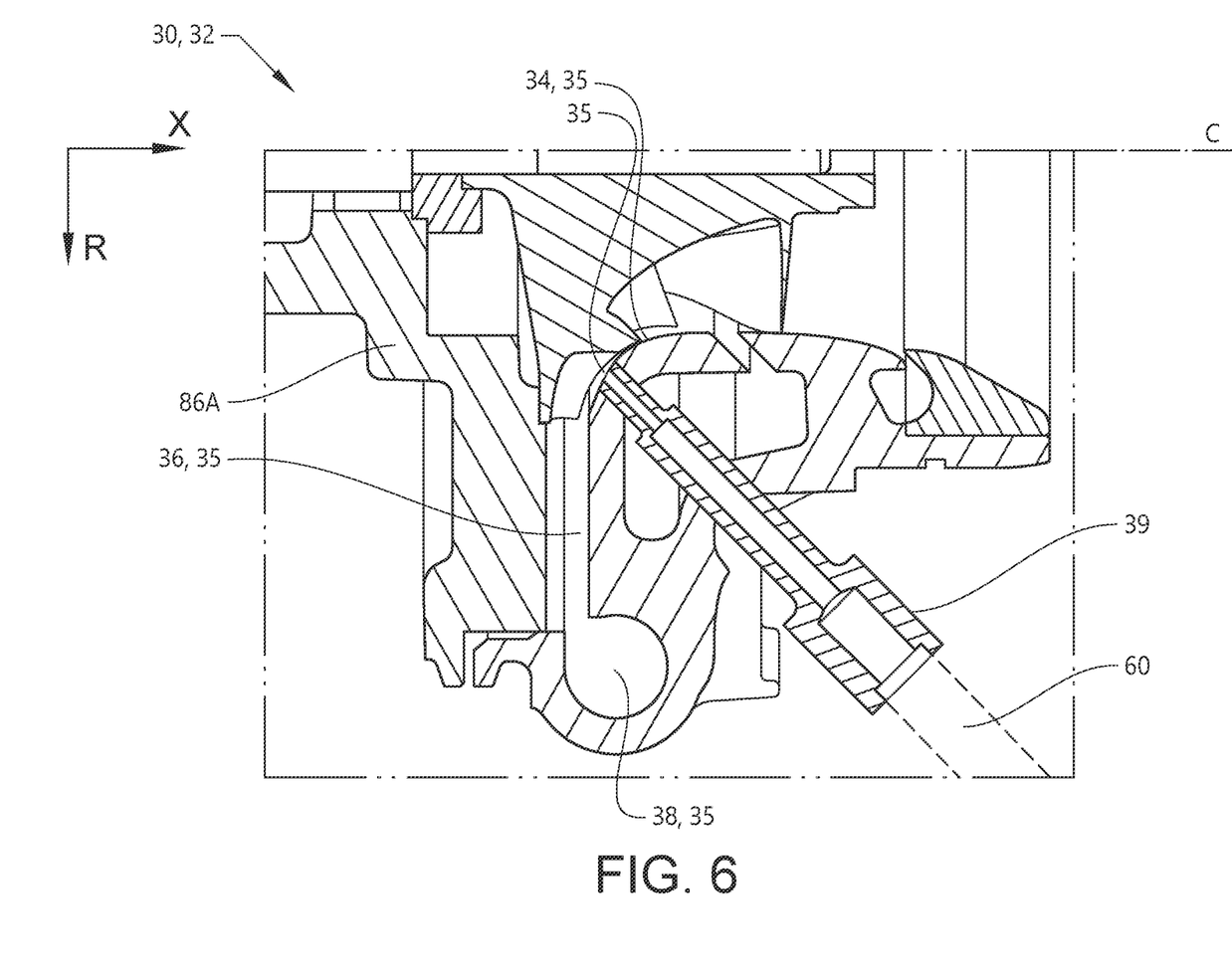
FIG. 6 is an enlarged cross-sectional schematic view of the turbocharger in FIGS. 1 to 4 according to an embodiment of the disclosure.

Turning again to the selected position 35 of the centrifugal compressor 32, as depicted in FIG. 6, the selected position 35 here corresponds to a radial position in a compressor housing 86 relative to an axial centre line C of the compressor 32, as illustrated in FIG. 6. FIG. 6 is an enlarged view of the centrifugal compressor 32 of the turbocharger 30.

Referring now to FIG. 6, in conjunction with FIG. 4, the buffer air conduit 60 is in fluid communication with the selected position 35, which here is at a radial position in the compressor housing 86 relative to the axial centre line C of the compressor 32. The centrifugal compressor further comprises a radial tap 39 arranged at a selected radius, as illustrated in FIG. 6. The radial tap 39 is configured to connect the buffer air conduit 60 to the compressor 32. In other words, the radial tap 39 is configured to connect the buffer air conduit 60 with the selected position 35 of the compressor 32.

In particular, the radial tap 39 extends from an outer radial position of the compressor 32 to the selected position 35 inside the compressor 32. As such, the outer radial position of the compressor 32, as depicted in FIG. 6, here corresponds to the selected radius.

By arranging the radial tap 39 in the turbocharger compressor housing on a suitable radius, it becomes possible to achieve an even more suitable pressure at the TC unit turbine seals 45, generally corresponding to a pressure between a lower critical pressure and a higher critical pressure. In this context, a too low pressure will allow oil to escape, while a high pressure may cause unnecessary losses or wear on the sealing elements 45A and 45B.

In some situations, if there is a high-pressure differential over either of the seals it may be at risk that the seals are moved axially away from each other. By arranging the radial tap in the turbocharger compressor housing on a suitable radius, it may also be possible to prevent, or at least reduce, excessive pressure in less favourable operating condition.

In other examples, the selected position 35 in or at the centrifugal compressor is any one of a position in or at a shroud portion 34, in or at a diffusor 36 and in or at a volute portion 38 of the centrifugal compressor. In other examples, the selected position 35 in or at the centrifugal compressor is a position in the compressor housing outlet 86A. Accordingly, the buffer air conduit 60 can be arranged in one of these selected positions and thus be in fluid communication with any one of a position in or at the shroud portion 34, the volute portion 36 and the diffusor 38 of the centrifugal compressor 32. By way of example, the radial tap 39 extends from the outer radial position of the compressor 32 to one of selected positions inside the compressor 32 corresponding to the shroud portion 34, the volute portion 36 or the diffusor 38.

As mentioned above, the arrangement of the buffer air conduit 60 between the TC unit 40 and the compressor 32 of the turbocharger 30 provides that the buffer air channel 48 of the TC unit 40 is in direct fluid communication with the selected position 35 in or at the compressor 32 via the buffer air conduit 60. It may also be noted that the buffer air conduit 60 is devoid of a control valve for controlling the pressure of the buffer air.

The buffer air supplied from the selected position 35 of the centrifugal compressor 32 to the TC unit 40 should be of an appropriate pressure for the reasons as described above. Typically, it may be enough with a few kPa higher pressure between the seals 45A, 45B compared to the pressure in the bearing housing 72 at all conditions. By way of example, a pressure of approximately 50 kPa may be sufficient in the majority of operating conditions.

By the arrangement of the buffer air conduit 60 between the selected position 35 of the compressor 32 and the TC unit 40, the desired (correct) pressure is obtained directly when the engine is started, i.e. during the process of building-up the wanted pressure at the compressor.

It is to be understood that the present disclosure is not limited to the embodiments described above and illustrated in the drawings; rather, the skilled person will recognize that many changes and modifications may be made within the scope of the appended claims.

The invention claimed is:

1. An internal combustion engine ("ICE"), system, comprising:
   an internal combustion engine ICE;
   a turbocharger receiving exhaust gases from the ICE, said turbocharger having a turbine and a compressor for compressing intake air and feeding said intake air to said ICE;
   a turbo turbine unit disposed in an exhaust gas path downstream the turbocharger and arranged to receive exhaust gas from the turbocharger; said turbo turbine unit having a turbine wheel, a bearing housing defining an inside volume for containing lubrication oil, and a sealing arrangement positioned in the vicinity of the turbine wheel for preventing lubrication oil from escaping from the inside volume of the bearing housing to an exhaust duct of the turbo turbine unit, wherein said ICE system further comprises:
   a buffer air conduit extending between a selected position in or at the compressor of the turbocharger, wherein said compressor comprises a radial tap arranged to extend from an outer radial position of the compressor to the selected position inside the compressor and configured to connect the buffer air conduit to the compressor, and a buffer air inlet of the turbo turbine unit, said buffer air inlet being arranged in fluid communication with a buffer air channel arranged inside the turbo turbine unit and adapted to direct buffer air to a position in-between axially opposite arranged annular sealing members of the sealing arrangement so as to provide a counter-pressure against at least one of the annular sealing members when the ICE is started.

2. The ICE system according to claim 1, wherein the buffer air channel extends from the buffer air inlet arranged at an outer periphery of the turbo turbine unit and through a solid part of the bearing housing of the turbo turbine unit.

3. The ICE system according to claim 1, wherein the buffer air channel of the turbo turbine unit is in direct fluid communication with the selected position in or at the compressor via the buffer air conduit.

4. The ICE system according to claim 1, wherein the buffer air conduit is devoid of a control valve for controlling the pressure of the buffer air.

5. The ICE system according to claim 1, wherein the turbo turbine unit comprises a turbine shaft arranged to carry the turbine wheel, said shaft being supported in the bearing housing by a bearing assembly.

6. The ICE system according to claim 5, wherein the sealing arrangement is arranged to prevent lubrication oil from escaping from the inside of the bearing housing along the turbine shaft into the exhaust gas stream.

7. The ICE system according to claim 1, wherein the sealing arrangement is a spring-tensioned sealing arrangement comprising corresponding radially biased annular sealing members to maintain the sealing arrangement in an axial position by friction forces between the radially biased annular sealing members and the bearing housing.

8. The ICE system according to claim 7, wherein the turbine shaft comprises a step bore arranged axially outside at least one of the annular sealing members.

9. The ICE system according to claim 1, further comprising an aftertreatment system disposed in the exhaust gas stream downstream the turbo turbine unit.

10. The ICE system according to claim 1, wherein the turbocharger and the turbo turbine unit are arranged in series.

11. The ICE system according to claim 1, wherein the turbine wheel of the turbo turbine unit is an axial-flow turbine wheel.

12. The ICE system according to claim 1, wherein the turbo turbine unit is a turbo-compound unit or a part of a low-pressure turbocharger unit.

13. The ICE system according to claim 1, wherein the compressor of the turbocharger is a centrifugal compressor.

14. The ICE system according to claim 1, wherein the selected position in or at the compressor is any one of a position in or at a shroud portion, a diffusor and a volute portion of the compressor.

15. The ICE system according to claim 14, wherein the selected position is at a radial position in a compressor housing outlet relative to an axial center line of the compressor.

16. A vehicle comprising an internal combustion engine system according to claim 1.

* * * * *